May 4, 1937.　　C. CLINKENBEARD　　2,079,244
POWER TAKE-OFF APPLIANCE
Filed March 14, 1936　　2 Sheets-Sheet 1
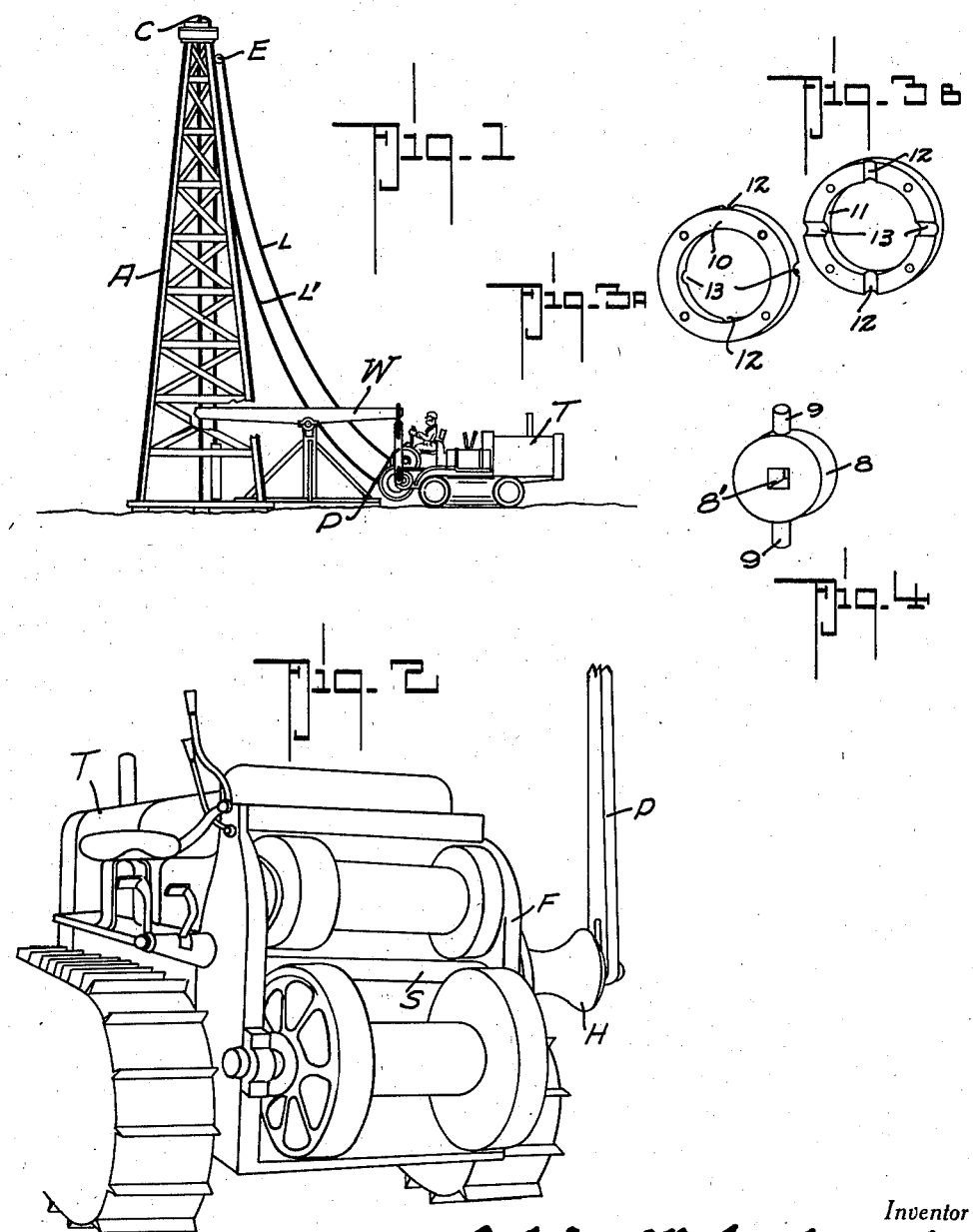
Inventor
Calvin Clinkenbeard
By
Herbert E. Smith
Attorney

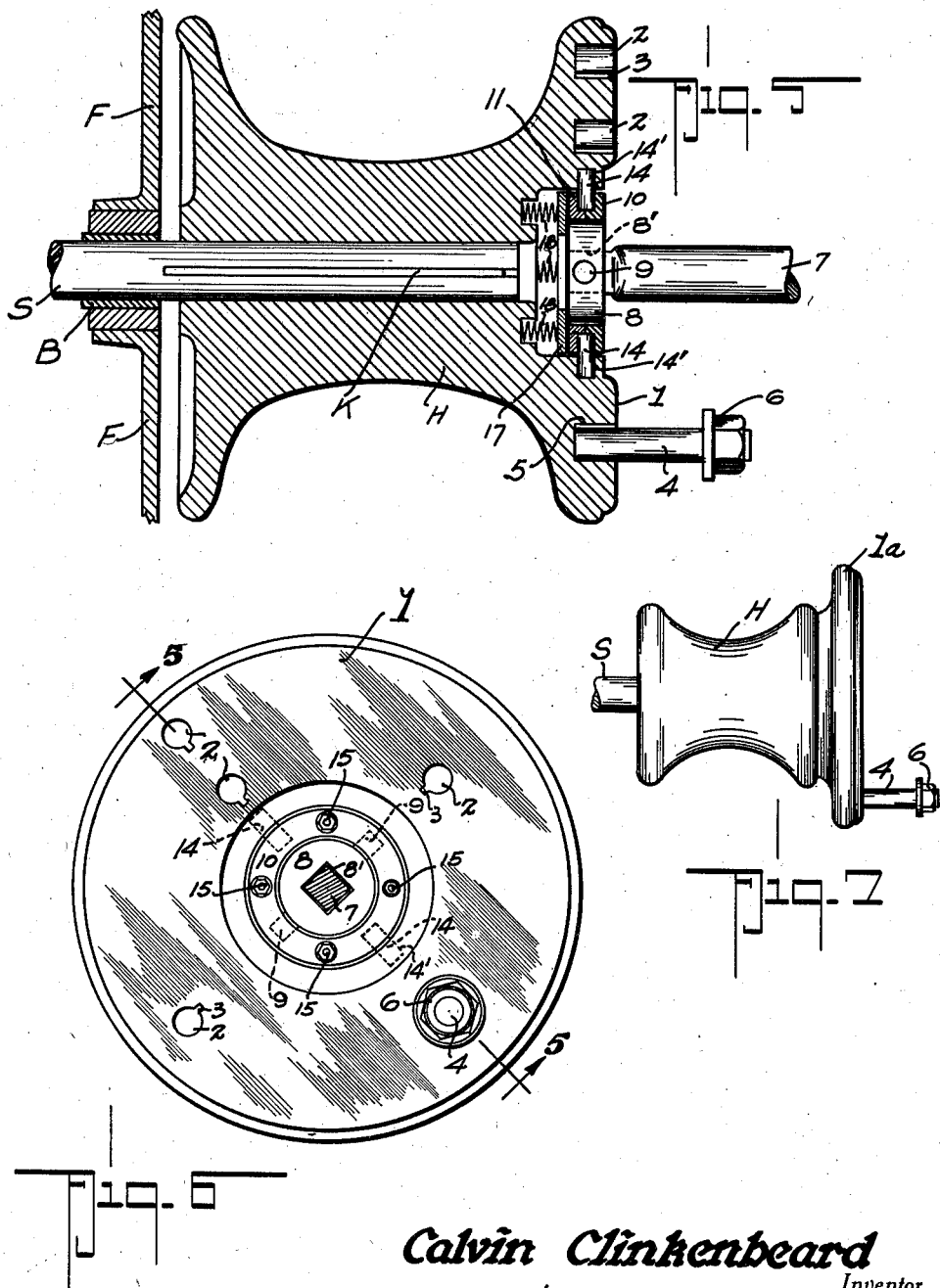

Patented May 4, 1937

2,079,244

UNITED STATES PATENT OFFICE 2,079,244

POWER TAKE-OFF APPLIANCE

Calvin Clinkenbeard, Spokane, Wash.

Application March 14, 1936, Serial No. 68,924

4 Claims. (Cl. 64—18)

My present invention relates to an improved power take-off appliance of the hub or pulley type, designed for attachment to an automotive vehicle or tractor. While the appliance is adapted for power transmission, generally, it is particularly designed for use in connection with a portable drilling equipment, as herein illustrated, in which equipment are included a derrick for the earth boring or drilling tools, the hoisting and operating lines, the power transmission mechanism and the portable power plant, as a tractor.

By the utilization of the portable drilling equipment and especially the power take off appliance, the various steps in the drilling operations involving the rotary drilling, pulling casings and drilling tools, operating the various power lines and hoisting lines, and movement of the equipment from one hole to another, are facilitated, to reduce the expense of operation, the saving of time and labor, and to insure efficiency in the operation of the equipment.

In carrying out my invention I utilize the auxiliary take off appliance in combination with an auxiliary take-off or power shaft of the tractor, and the parts are so combined and arranged that replacement and substitution of parts may readily be made for transmission of power through either reciprocating parts or rotary parts located between the tractor and the operating parts of the equipment.

The invention consists in certain novel combinations and arrangements of parts in the power take-off appliance as will hereinafter be more fully set forth and claimed. In the accompanying drawings I have illustrated one complete example, with a modification, of the physical embodiment of my invention wherein the parts are combined and arranged in accord with modes I have thus far devised for the practical application of the principles of my invention.

Figure 1 is a view showing the adaptation of the power take-off appliance of my invention and its use in connection with a tractor for operating the earth-boring or drilling equipment.

Figure 2 is an enlarged detail view of part of the tractor in connection with which the auxiliary power transmission appliance, or take-off appliance is used.

Figure 3a and Figure 3b are perspective views of the sectional or split ring employed in the shaft mounting for the transmission of power through rotary parts, and Figure 4 is a perspective view of a coupling ring also employed with the split ring in the flexible, rotary shaft mounting.

Figure 5 is an enlarged sectional detail view of the hub, pulley, or gypsy spool of the take-off appliance, showing the flexible shaft mounting for rotary transmission of power, and also the wrist pin used in reciprocal transmission of power from the take-off appliance, as at line 5—5 of Figure 6.

Figure 6 is a face at the right end of Figure 5.

Figure 7 shows a slightly modified form of the hub or pulley, which is sometimes referred to as a gypsy spool.

In order that the general arrangement, relation of parts, and utility of the take-off appliance may readily be understood I have shown in Figure 1 a portable well drilling equipment including the derrick A, crown block C and auxiliary block E together with the lines L and L' extending from the drums D and D' of the tractor T. For transmission of power through reciprocating parts, the walking beam W and pitman P are illustrated, and these parts receive power from the rotary take-off shaft S of the tractor, this shaft being journaled in suitable bearings as B mounted in frame F of the tractor T.

In carrying out my invention I utilize a gypsy spool, pulley, or hub H, which is keyed at K on the take-off shaft S, and this hub is instrumental in various ways for transmission of power from the tractor to the different parts of the equipment illustrated in Figure 1.

For a cranking movement in converting the rotary movement of the shaft S into a reciprocating movement of the pitman and oscillating movement of the walking beam W, the face of the outer head 1 of the hub is provided with a number of sockets 2 each having a keyway 3, and as seen in Figure 6 and also in Figure 5, a number, as five, of these sockets are provided. To vary the length of the stroke of the pitman P, these sockets are spaced at varying distances in the face of the head from its center. A wrist pin 4 with its key 5 is secured in a selected socket 2, and the end of the pitman P is mounted on the wrist pin and secured thereon by means of a nut and washer as 6.

As an auxiliary to the hub H I may employ a crank-disk 1a illustrated in Figure 7, upon which the wristpin 4 is mounted. The disk or ring 1a, as shown, is of greater diameter than the hub H, which permits mounting of the wrist pin on the disk at a greater distance from the center of the hub than the maximum distance of the sockets 2 in Figure 6, thereby increasing the length of stroke of the pitman P beyond the range of the sockets in the head of the hub. The disk or ring 1a is detachably secured, as by bolts, to the face of the hub, and it may readily be attached for use, or detached with equal facility when not required.

For rotary transmission of power from the shaft S and the hub H I employ an axially alined shaft 7 as an auxiliary, and to compensate for irregularities encountered in the use of the portable equipment, a flexible or universal joint is utilized between the hub and the auxiliary shaft 7. For this purpose I employ a round, flat head 8 having an angular or square central hole 8', and the head is fashioned with a pair of diametrically extending studs 9, 9, which are joined with a split ring that is mounted on the shaft-head 8.

The split ring encircles the head 8, and the latter is secured on the angular or squared end 7' of the shaft 7, and as best seen in Figures 3a and 3b this split ring comprises two complementary sections 10 and 11. The adjoining faces of the sections of the ring are diametrically notched as at 12, 12, and these notches or grooves form cylindrical seats for the two studs 9, 9 integral with the shaft-head 8. At diametrically opposite points, the adjoining faces of the two sections are notched or grooved at 13 to form seats for a pair of diametrically arranged pins 14 that project radially beyond the outer periphery of the split ring, and the two sections of the split ring are firmly secured together by transversely extending bolts 15.

The outer projecting ends of the two pins 14 are seated in sockets 14' formed in the wall of a circular recess 16, in the face of the head 1 of the hub, and the universal joint, which forms a flexible coupling between the hub and the auxiliary shaft 7 is conveniently mounted in this recess.

As a resilient backing for the flexible joint within the recess I employ a ring 17, which as seen in Figure 5 is of sufficient width in cross section as to bear against both the outer portion of the flat shaft-head 8 and the inner periphery of the split ring, and a number of springs 18 are seated in countersunk holes in the recessed hub to bear against the ring 17 and hold it as a backing for the coupling or flexible joint.

Through this universal joint or flexible coupling between the hub and the auxiliary shaft, power may be transmitted through the shaft to various operating parts of the boring and drilling equipment.

Having thus fully described my invention, what I claim as new and desire to secure by Letters Patent is:—

1. In a power take-off appliance, the combination with a rotary shaft, a recessed hub rigid therewith, and an auxiliary shaft having a head rigid therewith, of a ring pivotally mounted on the head and rotatable therewith, said ring pivotally mounted in the recessed hub and rotatable therewith, and a resilient backing between said ring and head and the recessed hub.

2. In a power take-off appliance the combination with a shaft having a rigid head and radial studs on said head, of a ring mounted on the head and having sockets for said studs, a driving hub enclosing said ring and rotatably connected therewith, and a resilient backing between said ring and head and the hub.

3. In a power take-off appliance, the combination with a rotary shaft, a recessed hub rigid therewith, and an auxiliary shaft having a rigid and radial studs, of a split ring mounted on the head with sockets to receive said studs, pins mounted in said ring and projecting into sockets in said hub, and a resilient backing between said ring and head and the hub.

4. In a power take-off appliance, the combination with a rotary shaft, a recessed hub rigid with said shaft, and an auxiliary shaft, of a round flat head rigid with the auxiliary shaft and a pair of diametrically arranged radial studs on said head, a split ring mounted on the head with sockets for said studs, a pair of pins mounted in the ring at diametrically opposite points to said studs, said recessed hub having sockets in its walls to receive said pins, a bearing ring within the recessed hub in contact with said ring and head, and a plurality of springs interposed between said bearing ring and the base wall of the recessed hub.

CALVIN CLINKENBEARD.